US006463966B1

(12) United States Patent
Goodger

(10) Patent No.: US 6,463,966 B1
(45) Date of Patent: Oct. 15, 2002

(54) FUEL GUARD

(76) Inventor: John A. Goodger, 7 Minti Rd., Coram, NY (US) 11727

( * ) Notice: Subject to any disclaimer, the term of this patent is extended or adjusted under 35 U.S.C. 154(b) by 0 days.

(21) Appl. No.: 09/578,616

(22) Filed: May 24, 2000

(51) Int. Cl.$^7$ ................................................ B65B 3/06
(52) U.S. Cl. .......................... 141/86; 141/1; 280/851; 220/573
(58) Field of Search .............................. 141/86, 1, 390, 141/392; 280/850–852; 137/312; 220/571, 573

(56) References Cited

U.S. PATENT DOCUMENTS

| | | | |
|---|---|---|---|
| 2,467,001 A | 4/1949 | Allen | 280/850 |
| 2,538,813 A | 1/1951 | Wagner | 141/390 |
| D162,115 S | 2/1951 | Barr | D14/6 |
| 2,555,868 A | 6/1951 | Bowman | 141/86 |
| D163,926 S | 7/1951 | Allen | D14/6 |
| 2,659,523 A | 11/1953 | Comber | 141/390 |
| 4,013,105 A | 3/1977 | Uuskallio | 141/86 |
| 4,817,691 A | 4/1989 | Lau | 141/390 |
| 4,830,067 A | 5/1989 | Foutch | 141/86 |
| D315,705 S | 3/1991 | Smith | D12/155 |
| 5,469,800 A * | 11/1995 | Brotz | 141/86 |
| 5,506,040 A * | 4/1996 | Cordani | 428/218 |
| 5,571,249 A | 11/1996 | Boylen | 141/86 |
| 5,692,547 A | 12/1997 | Lehr | 141/86 |
| 5,785,099 A | 7/1998 | Kashani | 141/86 |
| 5,934,312 A * | 8/1999 | Bellenger et al. | 137/312 |

* cited by examiner

Primary Examiner—J. Casimer Jacyna
(74) Attorney, Agent, or Firm—Harvey Lunenfeld

(57) ABSTRACT

A fuel absorbent device for maintaining fuel spills and preventing overflow, spillage, and splashes of liquid, fuel, and/or lubricant during a liquid, fuel, and/or lubricant filling process from contacting surfaces adjacent a liquid, fuel, and/or lubricant filler entrance. The fuel absorbent device has absorbent material, an opposing non skid surface, which is substantially impervious to liquid strikethrough, and a hole therethrough. Liquids, fuels, and lubricants contacting the absorbent material are typically contained within the absorbent material, and prevented from reaching adjacent surfaces by the opposing non skid surface, which is substantially impervious to liquid, fuel, and/or lubricant strikethrough. The opposing non skid surface also substantially prevents slippage of the fuel absorbent device thereon surfaces that the fuel absorbent device is removably placed thereon.

8 Claims, 3 Drawing Sheets

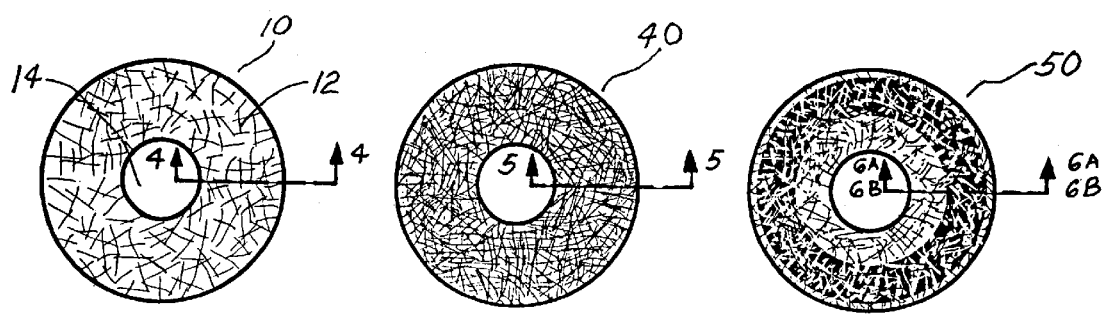
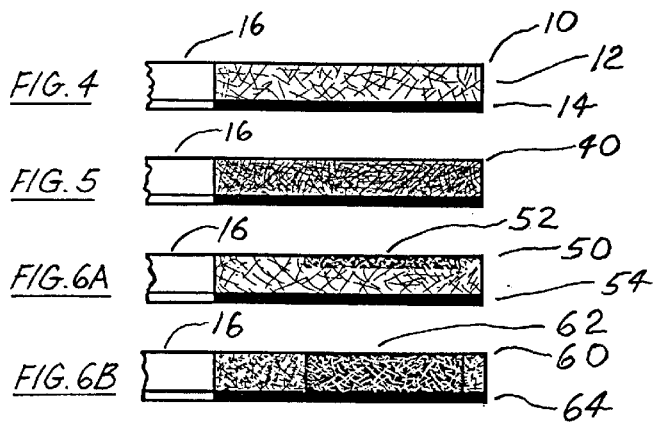
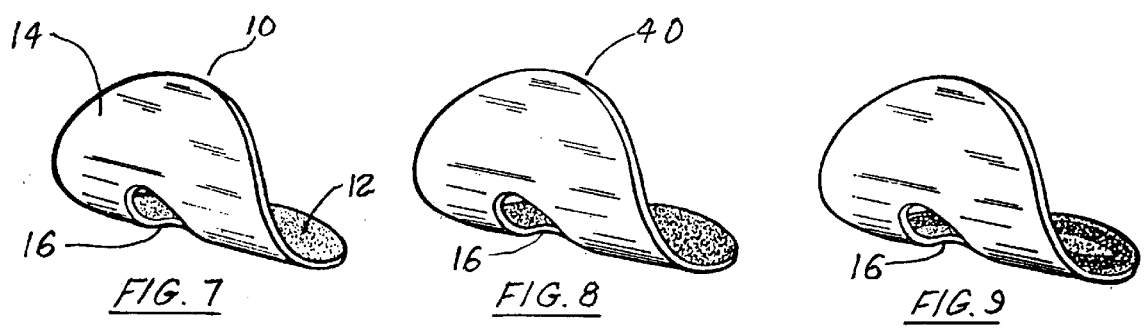
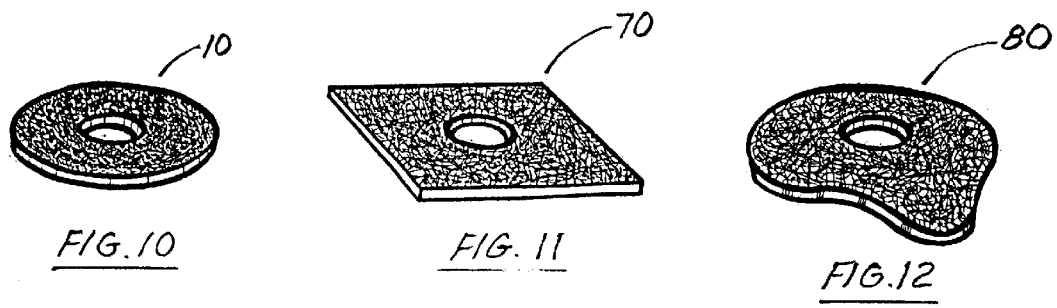

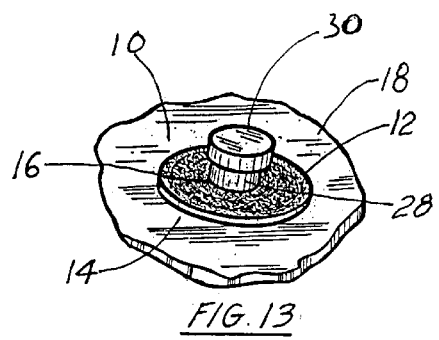
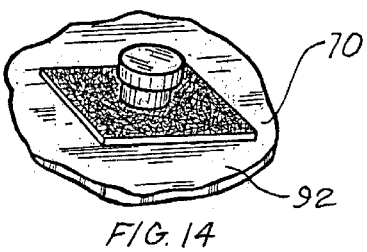
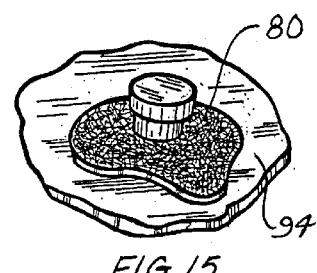
FIG. 13   FIG. 14   FIG. 15
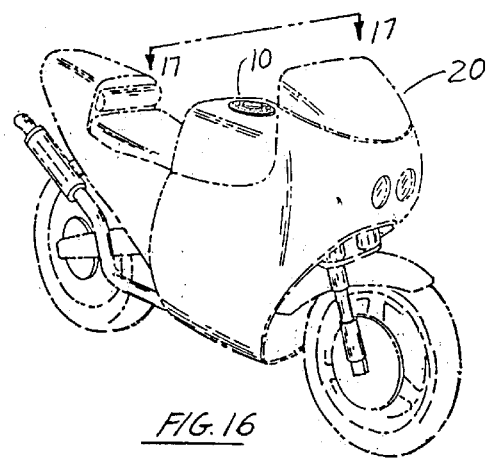
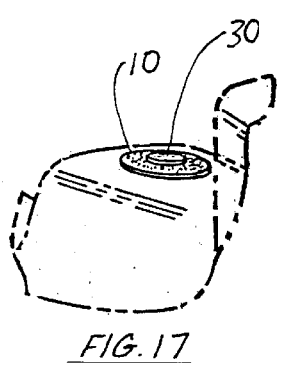
FIG. 16   FIG. 17
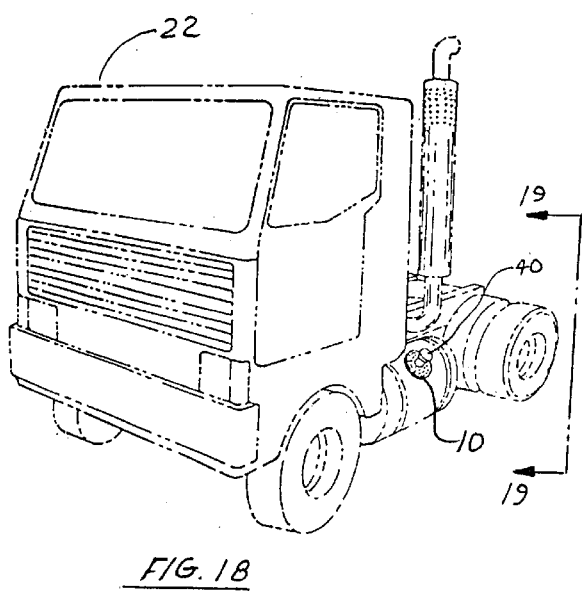
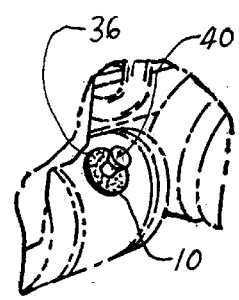
FIG. 18   FIG. 19

FUEL GUARD

BACKGROUND OF THE INVENTION

1. Field of the Invention

The present invention relates generally to fuel absorbent devices and more particularly to fuel absorbent devices for vehicles and stationary devices.

2. Background Art

Fueling of vehicles occurs at gasoline and fuel pumps world wide. However, depending upon the speed and care taken by the individual fueling such vehicles, fuel may inadvertently spill onto the vehicle, during the fueling process.

A fuel absorbent device is needed, which maintains fuel spills and prevents overflow, spillage, and splashes of fuel during the fuel filling process from contacting such vehicles adjacent the fuel filler entrance of the vehicles. The fuel absorbent device should be a fuel guard, which prevents fuel from contacting the vehicle adjacent the fuel filler pipe. The fuel absorbent device should be light weight, portable, and disposable in a safe and environmentally sound manner. The fuel absorbent device should also be useable in other fuel filling applications, in addition to vehicle fuel filling, and should also be useable in a variety of stationary applications, as well as vehicle applications.

The fuel absorbent device should shield vehicles from fuel spills, surges, and splashes adjacent the fuel filler pipe of such vehicles, prevents excess fuel from damaging the finish of the vehicles, and absorbs excess fuel. The fuel absorbent should be capable of being quickly, conveniently, and easily removably placed adjacently around the entrance orifice of fuel filler pipes of a variety of vehicles, portable, light weight, stored easily, have a non skid surface for placement against the vehicle and other devices, and be useable in stationary applications. The fuel absorbent device should also be durable, inexpensive, safe to use, attractive, sturdy, and of simple construction.

Different fuel protection devices and the like have been known. However, none of the fuel protection devices adequately satisfies these aforementioned needs.

U.S. Pat. No. 5,692,547 (Lehr) discloses an absorbent device for receiving fuel spills during the filling of a fuel tank, shown for a boat. The absorbent device has a gasket constructed from a matrix of melt down polypropylene fibers, frictionally held upon the fuel nozzle below the handle on the spout, having outer surfaces for engaging an entrance to the fuel tank and a central passageway defined by compliant walls, for preventing fuel surges from backing up out the fuel tank.

U.S. Pat. No. 2,538,813 (Wagner) discloses a detachably mounted fender protector apron for protecting an automobile's fender from gasoline spills, and U.S. Pat. No. 2,659,523 (Comber) discloses a combined protective bib and tubular extension for use over the open end of an automobile gasoline filler pipe, which is intended to prevent gasoline from damaging the automobile's paint finish. U.S. Pat. No. Des. 315,705 (Smith) discloses a gasoline bib for automobiles.

U.S. Pat. No. 4,817,691 (Lau) discloses a protective fuel fill bib intended to protect a large automobile fender area adjacent to the automobile's fill pipe, when an accidental trickle or massive overflow of fuel occurs from a fuel-hose nozzle during filling. The protective fuel fill bib has a trough shaped gasoline-resistant rubber sheet, which extends out and away from the automobile's finish when installed, and directs spilled fuel out and away from the automobile. When fuel is spilled from the fuel-hose nozzle, however, the fuel is diverted by the protective fuel fill bib onto the ground.

U.S. Pat. No. 5,785,099 (Kashani) discloses a fuel guard that protects the fender area of an automobile's surface from damage caused by gasoline spills during refueling, and marring caused by incidental contact with the fuel pump nozzle. Runoff fuel, however, is diverted to and drips onto the ground.

U.S. Pat. No. 4,830,067 (Foutch) discloses a splash guard for an automotive fill pipe comprising a flexible plastic baffle positioned over the fill pipe cap and having a central hole sized to sealingly engage a gas pump nozzle. The baffle is hingedly attached to the vehicle adjacent one side of the fill pipe and releasably attached adjacent the other side of the fill pipe. In one embodiment, the baffle hinged attachment is to the inside of the access door to the fill pipe. In another embodiment, the attachment is to a bracket in turn attached to the fill pipe. In either embodiment the baffle is manually movable to permit removal and replacement of the fill pipe cap.

U.S. Pat. No. 2,555,868 (Bowman) discloses a drip tray for protecting the finish of an automobile fender or adjacent parts from drippings or possible overflow of gasoline, when gasoline is being fed into the fuel tank of the automobile.

U.S. Pat. No. 5,571,249 (Boylen) discloses a fluid sleeve for channeling fluid spilled during the servicing of a motorized vehicle having a top portion. A body portion defines a first opening operable to engage a fluid inlet of the motorized vehicle and a second opening operable to engage a fluid outlet of a fluid container received therethrough to be disposed in the fluid inlet. In use, when fluid is discharged or otherwise spilled from the fluid inlet or the fluid outlet during servicing, the fluid is retained within the body portion and channeled toward a bottom portion.

U.S. Pat. No. 4,013,105 (Uuskallio) discloses a pan-like spilled fuel diverter, which overlies the fuel tank of a small engine and has the filler neck on top of the tank projecting through a hole in the bottom wall of the diverter with a liquid-tight connection therebetween. A portion of the diverter projects laterally beyond a side of the tank remote from the engine cylinder and has a downwardly projecting discharge spout spaced from the tank. A downwardly and outwardly slanting deflector at the bottom end of the spout directs spilled liquid that is caught by the diverter away from the tank.

U.S. Pat. No. 2,467,001 (Allen) discloses a scuff pad for automobile fenders.

U.S. Pat. Nos. Des. 162,115 (Barr) and Des. 163,926 (Allen) disclose automobile gasoline door guards.

For the foregoing reasons, there is a need for a fuel absorbent device, which maintains fuel spills and prevents overflow, spillage, and splashes of fuel during the fuel filling process from contacting vehicles adjacent the fuel filler entrance of such vehicles. The fuel absorbent device should be a fuel guard, which prevents fuel from contacting the vehicle adjacent the fuel filler entrance areas of such vehicles. The fuel absorbent device should be light weight, portable, and disposable in a safe and environmentally sound manner.

The fuel absorbent device should shield vehicles from fuel spills, surges, and splashes adjacent the fuel filler pipe of such vehicles, prevents excess fuel from damaging the finish of the vehicles, and absorbs excess fuel. The fuel absorbent should be capable of being quickly, conveniently, and easily removably placed adjacently around the entrance orifice of fuel filler pipes of a variety of vehicles, portable, light weight, stored easily, have a non skid surface for placement against the vehicle and other devices, and also be useable in stationary applications. The fuel absorbent device should be durable, inexpensive, safe to use, attractive, sturdy, and of simple construction. The fuel absorbent device should also be useable in other fuel filling applications, in addition to vehicle fuel filling, and should also be useable in a variety of stationary applications, as well as vehicle applications.

SUMMARY

The present invention is directed to a fuel absorbent device, which maintains fuel spills and prevents overflow, spillage, and splashes of fuel from contacting vehicles and other devices adjacent the fuel filler entrance of the vehicles and the other devices, during the fuel filling process. The fuel absorbent device is light weight, portable, and may be disposed of in a safe and environmentally sound manner.

The fuel absorbent device shields vehicles and other devices from fuel spills, surges, and splashes adjacent the fuel filler pipe of such vehicles and other devices, prevents excess fuel from damaging the finish of the vehicles, and absorbs the excess fuel. The fuel absorbent is capable of being quickly, conveniently, and easily removably placed adjacently around the entrance orifice of fuel filler pipes of a variety of vehicles, portable, light weight, stored easily, has a non skid surface for placement against the vehicle and other devices, and is also be useable in stationary applications. The fuel absorbent device is durable, inexpensive, safe to use, attractive, sturdy, and of simple construction. The fuel absorbent device is useable in other fuel filling applications, in addition to vehicle fuel filling, and is useable in a variety of stationary applications, as well as vehicle applications.

A fuel absorbent device for preventing overflow, spillage, and splashes of liquid, fuel, and/or lubricant during a liquid, fuel, and/or lubricant filling process from contacting surfaces adjacent a liquid, fuel, and/or lubricant filler entrance having features of the present invention comprises: absorbent material; an opposing non skid surface, the non skid surface being substantially impervious to liquid, fuel, and/or lubricant strikethrough; the absorbent device having a hole therethrough.

A process for constructing a fuel absorbent device having features of the present invention comprises at least the following steps: a) extruding fibers of polypropylene and ethyl methacrylate, the extruded fibers optionally of approximately 95 percent polypropylene and optionally less than approximately five percent ethyl methacrylate; b) optionally dyeing and blending the extruded fibers to a selected fluorescent color or other suitable color; c) optionally ultraviolet stabilizing the optionally dyed and blended fibers; d) carding the optionally dyed, blended, and ultraviolet stabilized fibers; e) cross lapping the optionally dyed, blended, and ultraviolet stabilized fibers to build fine web layers to a required density, thickness, and width; f) needle punching the cross lapped fibers to mechanically entangle the cross lapped fibers; g) heat stabilizing the needle punched fibers to fuse the needle punched fibers one with the other; h) chilling the heat stabilized fibers; i) calendering one side of the chilled heat stabilized fibers to produce a smooth finish, which results in a non-skid surface of coextruded non-skid barrier film, the opposing heat fused side being hydrophilic and oleophilic; j) cutting or dye cutting the resulting fibrous nonwoven needlepunched barrier sorbent material, which is chemically resistant to liquid, fuel, and/or lubricant strike-through to shape.

DRAWINGS

These and other features, aspects, and advantages of the present invention will become better understood with regard to the following description, appended claims, and accompanying drawings where:

FIG. 1 is a top view of a fuel absorbent device, constructed in accordance with the present invention;

FIG. 2 is a top view of an alternate embodiment of a fuel absorbent device, constructed in accordance with the present invention;

FIG. 3 is a top view of another alternate embodiment of a fuel absorbent device, constructed in accordance with the present invention;

FIG. 4 is a side cross section view of the fuel absorbent device of FIG. 1;

FIG. 5 is a side cross section view of the fuel absorbent device of FIG. 2;

FIG. 6A is a side cross section view of an embodiment of the fuel absorbent device of FIG. 3;

FIG. 6B is a side cross section view of an alternate embodiment of the fuel absorbent device of FIG. 3;

FIG. 7 is a perspective view of the fuel absorbent device of FIGS. 1 and 4;

FIG. 8 is a perspective view of the fuel absorbent device of FIGS. 2 and 5;

FIG. 9 is a perspective view of the fuel absorbent devices of FIGS. 3, 6A, and 6B;

FIG. 10 is a perspective view of the fuel absorbent devices of FIGS. 1–9;

FIG. 11 is a perspective view of an alternate embodiment of a fuel absorbent device, constructed in accordance with the present invention;

FIG. 12 is a perspective view of another alternate embodiment of a fuel absorbent device, constructed in accordance with the present invention;

FIG. 13 is a perspective view of the fuel absorbent devices of FIG. 10 mounted on a vehicle or device;

FIG. 14 is a perspective view of the fuel absorbent devices of FIG. 11 mounted on a vehicle or device;

FIG. 15 is a perspective view of the fuel absorbent devices of FIG. 12 mounted on a vehicle or device;

FIG. 16 is a perspective view of the fuel absorbent devices of FIGS. 10 and 13 mounted on a motorcycle;

FIG. 17 is an enlarged perspective view of the fuel absorbent devices of FIGS. 10 and 13 mounted on the motorcycle of FIG. 16;

FIG. 18 is a perspective view of the fuel absorbent devices of FIGS. 10 and 13 mounted on a truck;

FIG. 19 is an enlarged perspective view of the fuel absorbent devices of FIGS. 10 and 13 mounted on the truck of FIG. 18;

DESCRIPTION

Figure 20:
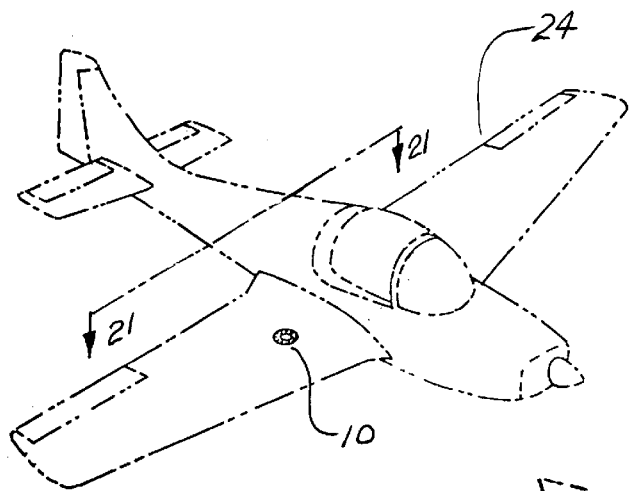
FIG. 20 is a perspective view of the fuel absorbent devices of FIGS. 10 and 13 mounted on an airplane.
Figure 21:
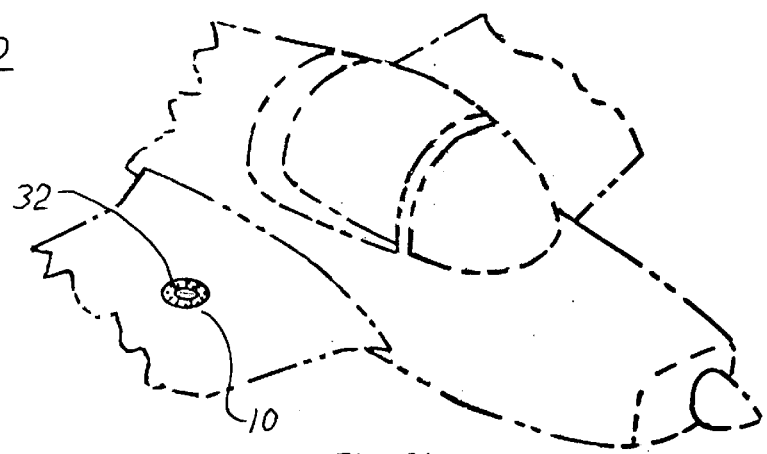
FIG. 21 is an enlarged perspective view of the fuel absorbent devices of FIGS. 10 and 13 mounted on the airplane of FIG. 20.
Figure 22:
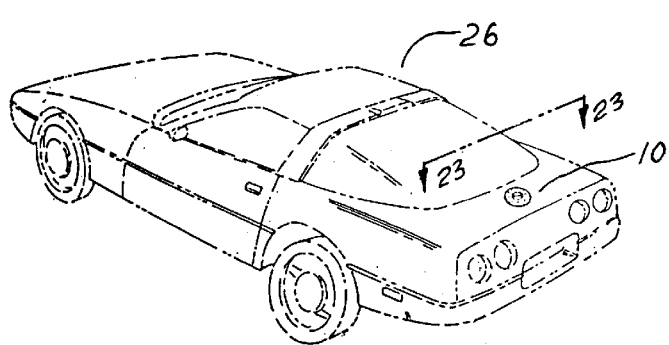
FIG. 22 is a perspective view of the fuel absorbent devices of FIGS. 10 and 13 mounted on an automobile.
Figure 23:
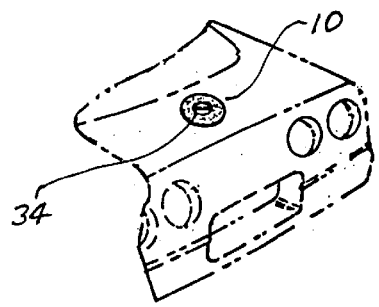
FIG. 23 is an enlarged perspective view of the fuel absorbent devices of FIGS. 10 and 13 mounted on the automobile of FIG. 22.

The preferred embodiments of the present invention will be described with reference to FIGS. 1–23 of the drawings. Identical elements in the various figures are identified with the same reference numbers.

FIGS. 1, 4, and 7 show an embodiment of the present invention, a fuel absorbent device 10 having absorbent material 12, opposing non skid surface 14, which is substantially impervious to liquid strikethrough, and hole 16. Liquids, fuels, and lubricants contacting the absorbent material 12 may typically be contained within the absorbent material 12 and prevented from reaching adjacent surfaces by the opposing non skid surface 14, which is substantially impervious to liquid strikethrough. The opposing non skid surface 14 also substantially prevents slippage of the fuel absorbent device 10 thereon surfaces that the fuel absorbent device 10 is removably placed thereon.

The fuel absorbent device 10 may be used to prevent overflow, spillage, and splashes of liquids, fuel and/or lubricant from contacting a vehicle or device adjacent a liquid, fuel, and/or lubricant filler entrance of the vehicle or the device, during liquid, fuel, and/or lubricant filling processes. The fuel absorbent device 10 may be used to prevent liquids, fuel, and lubricants from contacting surfaces of the vehicle and/or device, and protect a variety of devices and vehicles from overflow, spillage, and splashes of fuel and lubricants. Such devices may include stationary, portable, and mobile devices, which often have engines and motors, requiring liquids, fueling ,or lubrication. The absorbent device 10 may also be used to maintain liquid, fuel, and/or lubricant spills. The fuel absorbent device 10 of FIGS. 1, 4, and 7 is also shown in FIG. 10, and is shown mounted on a surface 18 in FIG. 13, and mounted on a motorcycle 20, truck 22, airplane 24, and automobile 26 in FIGS. 16–23.

The fuel absorbent device 10 is mounted thereat the surface 18 having the fuel absorbent device non skid surface 14 adjacent the surface 18 and the fuel absorbent device hole 16 thereabout and adjacent fuel filler entrance 28. The fuel absorbent device non skid surface 14 aids in preventing the fuel absorbent device 10 from slipping off the surface 18 on devices or vehicles having recessed or contiguous fuel filler entrances 30, 32, and 34, such as shown on the motorcycle 20, the airplane 24, and the automobile 26, respectively. The fuel absorbent device 10 may be used with raised, recessed, or contiguous fuel filler entrances. The fuel absorbent device 10 is also shown mounted on the surface 18 having the raised fuel filler entrance 28 and on the truck 22 also having a raised fuel filler entrance 36. The fuel filler entrance 28 may be in the form of a pipe or other suitable fuel filler entrance. The fuel absorbent device 10 is constructed of hydrophilic and oleophilic material and may be fluorescent. Fuel filler entrance covers 38 and 40 are also shown in FIGS. 13, 18, and 19. Fuel filler entrance covers have been removed from FIGS. 16, 17, and 20–23 for illustrative purposes.

The fuel absorbent device 10 is hydrophilic and oleophilic and is constructed of hydrophilic and oleophilic material. The fuel absorbent device 10 is constructed of barrier sorbent material, which may be nonwoven polypropylene or other suitable material. Loose fibers of the nonwoven polypropylene or other suitable material may be dyed fluorescent color and/or a bright color to make the fuel absorbent device 10 easily visible in darkness and in daylight. The fuel absorbent device 10 is typically ultraviolet stabilized.

The fuel absorbent device 10 is typically constructed of fibrous nonwoven needlepunched barrier sorbent material. The absorbent material 12 is typically heat fused, and the opposing non skid surface 14 is typically coextruded having a non skid barrier film. The fibrous nonwoven needlepunched barrier sorbent material, thus, has a heat fused side and an opposing side having a coextruded non-skid barrier film, which is resistant to liquid strike-through, and in particular chemically resistant to liquid strikethrough. The sorbent material is hydrophilic and oleophilic, and is ultraviolet stabilized. The fuel absorbent device 10 is typically of polypropylene and percent ethyl methacrylate. The fuel absorbent device 10 is preferably of approximately 95 percent polypropylene and less than approximately five percent ethyl methacrylate. Other percentages may be used, as well. Other mixtures of polypropylene and other suitable materials are also useable, and the percentages of each may vary depending upon required physical characteristics.

The fuel absorbent device 10 having the fibrous nonwoven needlepunched barrier sorbent material is best constructed in a process having the following steps:

a) extruding fibers of polypropylene and ethyl methacrylate, the extruded fibers optionally of approximately 95 percent polypropylene and optionally less than approximately five percent ethyl methacrylate;

b) optionally dyeing and blending the extruded fibers to a selected fluorescent color or other suitable color;

c) optionally ultraviolet stabilizing the optionally dyed and blended fibers;

d) carding the optionally dyed, blended, and ultraviolet stabilized fibers;

e) cross lapping the optionally dyed, blended, and ultraviolet stabilized fibers to build fine web layers to a required density, thickness, and width;

f) needle punching the cross lapped fibers to mechanically entangle the cross lapped fibers;

g) heat stabilizing the needle punched fibers to fuse the needle punched fibers one with the other;

h) chilling the heat stabilized fibers;

i) calendering one side of the chilled heat stabilized fibers to produce a smooth finish, which results in a non-skid surface of coextruded non-skid barrier film, the opposing heat fused side being hydrophilic and oleophilic;

j) cutting or dye cutting the resulting fibrous nonwoven needlepunched barrier sorbent material, which is chemically resistant to liquid, fuel, and/or lubricant strike-through, to shape.

FIGS. 1, 4, and 7 show the fuel absorbent device 10 having absorbent material 12 having a natural polypropylene color. FIGS. 2, 5, and 8 show an alternate embodiment of a fuel absorbent device 40, which is substantially the same as the fuel absorbent device 10, except that the fuel absorbent device 40 has a fluorescent color or other color. FIGS. 3, 6A, and 6B show other alternate embodiments of fuel absorbent devices 50 and 60, which are substantially the same as the fuel absorbent device 40, except that the fuel absorbent devices 50 and 60 have fluorescent color or other color pattern on absorbent material 52 and within absorbent material 62, respectively. The fluorescent color or other color pattern may be paint sprayed onto the exterior of the absorbent material 52 of the fuel absorbent device 50, or embedded therein the absorbent material 62 of the fuel absorbent device 60, according to the process having the steps described herein above. The fuel absorbent devices 50 and 60 also have non skid surfaces 54 and 64, respectively.

FIG. 10 shoes a typical shape of the fuel absorbent devices 10, 40, 50, and 60, which may typically be round or elliptical. FIGS. 11 and 12 show yet other alternate embodiments of fuel absorbent devices 70 and 80, which are substantially the same as the fuel absorbent devices 10, 40, 50, and 60, except that the fuel absorbent devices 70 and 80 have square, diamond shape, or rectangular shape as in the fuel absorbent device 70 of FIG. 11, and other shapes to fit specific needs of the user, as in the fuel absorbent device 80 of FIG. 12. FIGS. 13 shows the fuel absorbent devices 10, 40, 50, and 60 of FIG. 10 mounted on the surface 18. FIG. 14 shows the fuel absorbent device 70 of FIG. 11 mounted on a surface 92, and FIG. 15 shows the fuel absorbent device 80 of FIG. 12 mounted on a surface 94.

Although the present invention has been described in considerable detail with reference to certain preferred versions thereof, other versions are possible. Therefore, the spirit and scope of the appended claims should not be limited to the description of the preferred versions contained herein.

What is claimed is:

1. An absorbent device for preventing overflow, spillage, and splashes of liquid, fuel, and/or lubricant during a liquid, fuel, and/or lubricant filling process from contacting surfaces adjacent a liquid, fuel, and/or lubricant filler entrance comprising:

absorbent material:

an opposing non skid surface, said non skid surface being substantially impervious to liquid, fuel, and/or lubricant strikethrough;

said absorbent device being fluorescent, and having a hole therethrough.

2. An absorbent device for preventing overflow, spillage, and splashes of liquid, fuel, and/or lubricant during a liquid, fuel, and/or lubricant filling process from contacting surfaces adjacent a liquid, fuel, and/or lubricant filler entrance comprising:

absorbent material;

an opposing non skid surface, said non skid surface being substantially impervious to liquid, fuel, and/or lubricant strikethrough;

said absorbent device having at least one fluorescent surface, and having a hole therethrough.

3. An absorbent device for preventing overflow, spillage, and splashes of liquid, fuel, and/or lubricant during a liquid, fuel, and/or lubricant filling pieces from contacting surfaces adjacent a liquid, fuel, and/or lubricant filler entrance comprising:

absorbent material, said absorbent material being heat fused;

an opposing non skid surfaces said non skid surface being substantially impervious to liquid, fuel, and/or lubricant strikethrough, being coextruded, and having a non skid barrier film;

said absorbent device having a hole therethrough.

4. The absorbent device according to claim 3, wherein said fuel absorbent device is of approximately 95 percent polypropylene and less than approximately five percent ethyl methacrylate.

5. A process for constructing an absorbent device for preventing overflow, spillage, and splashes of liquid, fuel, and/or lubricant during a liquid, fuel, and/or lubricant filling process from contacting surfaces adjacent a liquid, fuel, and/or lubricant filler entrance comprising at least the following steps:

a) extruding fibers of polypropylene and ethyl methacrylate, said extruded fibers optionally of approximately 95 percent polypropylene and optionally less than approximately five percent ethyl methacrylate;

b) optionally dyeing and blending said extruded fibers to a selected fluorescent color or other suitable color;

c) optionally ultraviolet stabilizing said optionally dyed and blended fibers;

d) carding said optionally dyed, blended, and ultraviolet stabilized fibers;

e) cross lapping said optionally dyed, blended, and ultraviolet stabilized fibers to build fine web layers to a required density, thickness, and width;

f) needle punching said cross lapped fibers to mechanically entangle said cross lapped fibers;

g) heat stabilizing said needle punched fibers to fuse said needle punched fibers one with the other;

h) chilling said heat stabilized fibers;

i) calendering one side of said chilled heat stabilized fibers to produce a smooth finish, which results in a non-skid surface of coextruded non-skid barrier film, said opposing heat used side being hydrophilic and oleophilic;

j) cutting or dye cutting said resulting fibrous nonwoven needlepunched barrier sorbent material, which is chemically resistant to liquid, fuel, and/or lubricant strike-through, to shape.

6. The process for constructing an absorbent device according to claim 5, wherein further said process comprises the following additional step:

k) making a hole therethrough said resulting fibrous nonwoven needlepunched barrier sorbent material, which is chemically resistant to liquid, fuel, and/or lubricant strike-through.

7. An absorbent device for preventing overflow, spillage, and splashes of liquid, fuel, and/or lubricant during a liquid, fuel, and/or lubricant filling process from contacting surfaces adjacent a liquid, fuel, and/or lubricant filler entrance comprising:

absorbent material, an opposing non skid surface, said non skid surface being substantially impervious to liquid, fuel, and/or lubricant strikethrough;

said absorbent device of polypropylene and ethyl methacrylate, and having a hole therethrough.

8. The absorbent device according to claim 7, wherein said absorbent device is of approximately 95 percent polypropylene and less than approximately five percent ethyl methacrylate.

* * * * *